(12) United States Patent
Lee (10) Patent No.: US 8,544,078 B2
(45) Date of Patent: Sep. 24, 2013

(54) FLEXIBLE NETWORK SECURITY SYSTEM AND METHOD FOR PERMITTING TRUSTED PROCESS

(75) Inventor: Dong-Hyuk Lee, Seoul (KR)

(73) Assignee: Cap Co., Ltd. (KR)

( * ) Notice: Subject to any disclaimer, the term of this patent is extended or adjusted under 35 U.S.C. 154(b) by 1471 days.

(21) Appl. No.: 10/582,127

(22) PCT Filed: Dec. 27, 2004

(86) PCT No.: PCT/KR2004/003456
§ 371 (c)(1),
(2), (4) Date: Jun. 7, 2006

(87) PCT Pub. No.: WO2005/064842
PCT Pub. Date: Jul. 14, 2005

(65) Prior Publication Data
US 2007/0226788 A1 Sep. 27, 2007

(30) Foreign Application Priority Data
Dec. 31, 2003 (KR) .................. 10-2003-0101775

(51) Int. Cl.
*G06F 9/00* (2006.01)
*G06F 15/16* (2006.01)
*G06F 17/00* (2006.01)

(52) U.S. Cl.
USPC .............................................. 726/11; 726/29

(58) Field of Classification Search
None
See application file for complete search history.

(56) References Cited

U.S. PATENT DOCUMENTS

| 6,728,885 | B1 * | 4/2004 | Taylor et al. .................... 726/24 |
| 7,146,638 | B2 * | 12/2006 | Malcolm ......................... 726/11 |
| 2003/0115327 | A1 * | 6/2003 | Kokado et al. ................ 709/225 |
| 2003/0149887 | A1 * | 8/2003 | Yadav .......................... 713/200 |

FOREIGN PATENT DOCUMENTS

| JP | 2004-054488 | 2/2004 |
| KR | 1020010090014 A | 10/2001 |
| KR | 2002-0001190 | 9/2002 |
| KR | 2002-0086434 | 11/2002 |

OTHER PUBLICATIONS

International Preliminary Report on Patentability; PCT/KR2004/003456; Date: Apr. 14, 2006.
Inernational Search Report; PCT/KR2004/003456; Date: Apr. 11, 2005.
Written Opinion of the International Preliminary Examining Authority (PCT Rule 66); PCT/KR2004/003456; Date: Jan. 10, 2006.
Written Opinion of the International Searching Authority (PCT Rule 43bis.1); PCT?KR2004/003456; Date: Apr. 11, 2005.
"Up-to-date Information about personal firewall preventing cracker, worm and spyware", by Dakayoshi Amada, Nikkei Business publication Inc., Japan, Nikkei Network No. 32, Nov. 22, 2002, p. 76-83.

* cited by examiner

*Primary Examiner* — Nadia Khoshnoodi (57) ABSTRACT

A flexible network security system and method is provided for permitting a trusted process. The system includes a port monitoring unit for extracting information about a server port being used through a network communication program, an internal permitted program storage for extracting information about a program for which communication is permitted by the firewall and registering the extracted information, an internal permitted port storage registering the extracted information if the network communication program is registered in the internal permitted program storage; and a device for making the firewall flexible, determining whether a destination port of a packet of inbound traffic has been registered in the internal permitted port storage, and if the destination port has not been registered, transmitting the corresponding packet to the firewall, and if the destination port has been registered, allowing the corresponding packet to bypass the firewall.

25 Claims, 6 Drawing Sheets

FLEXIBLE NETWORK SECURITY SYSTEM AND METHOD FOR PERMITTING TRUSTED PROCESS

TECHNICAL FIELD

The present invention relates generally to a flexible network security system and method for permitting a trusted process and, more particularly, to a network security system and method, in which a port, which is used by a program for which communication is permitted, is automatically added to or removed from an internet connection firewall, thus allowing inexpert users to easily use the internet connection firewall having excellent functionality.

BACKGROUND OF THE ART

A firewall is a security system that forms a protection border between a network and the outside thereof.

Figure 1:
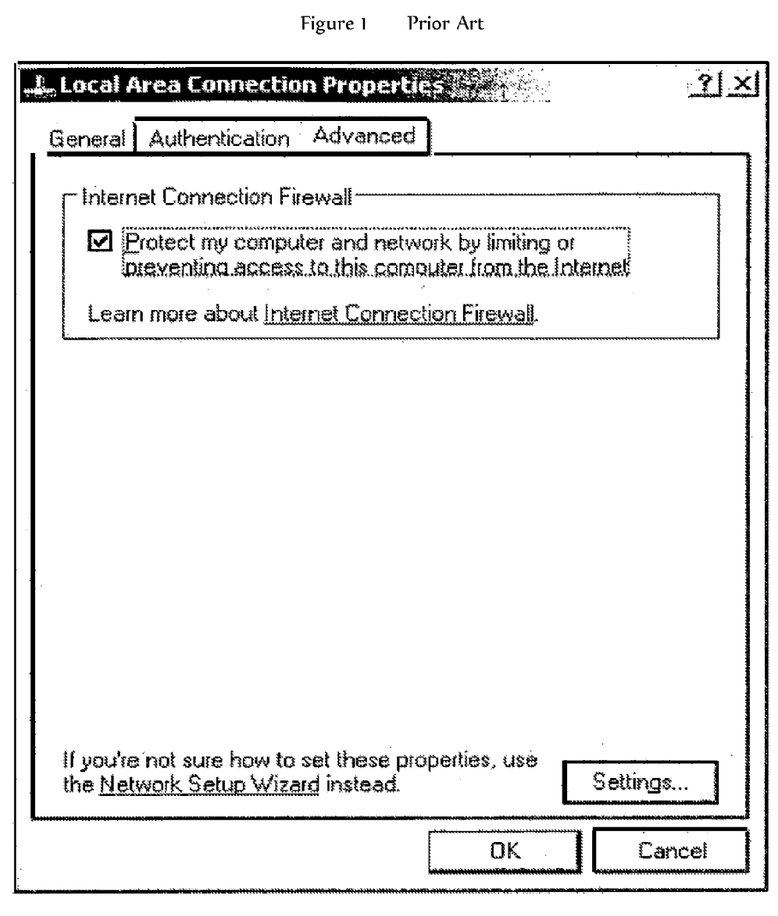
FIG. 1 is a view showing an ICF for protecting a computer and a network, which has basically been provided by Microsoft Inc. since the XP version of Windows.

FIG. 1 is a view showing an Internet Connection Firewall (ICF) for protecting a computer and a network, which has been basically provided by Microsoft Inc. since the XP version of Windows.

The ICF is software used to set restrictions on information communicated between a network or small-scale network and the Internet, and protects an Internet connection of a single computer to the Internet.

Meanwhile, a conventional ICF is a stateful firewall. The term stateful firewall refers to a firewall which monitors all the communication passing through a corresponding path, and inspects the original of each message to be processed, a target address and a port.

The ICF permits outbound traffic but blocks inbound traffic, so that a network inside the ICF is not seen from the outside. For this reason, in a Personal Computer (PC) firewall, this function is referred to as a "stealth function."

The operation of the ICF is described in brief below.

The ICF keeps track of traffic originating from an ICF computer, and maintains a communication table, so that unwanted traffic does not enter through the personal connection. Further, all inbound traffic on the Internet is compared with the items in the table. Only in the case where it is proved that a matching item exists in the table and communication originated from the user's computer, inbound Internet traffic is connected to a network computer.

In contrast, in the case where an Internet connection is not permitted on the basis of a firewall permission list, the ICF disconnects the connection. Accordingly, general hacking, such as port scanning, can be blocked by automatically canceling unwanted communication.

For example, when an ICF computer is scanned using a Linux nmap scanning tool in order to check such a case, the ICF computer does not respond to any scan operation, so that Network Mapper (Nmap) determines that a target computer does not exist on a network for every scan, and outputs the message "Host Seems Down." As described above, the ICF blocks general hacking, such as port scanning, is performed by automatically canceling unwanted communication.

Meanwhile, when the ICF is installed in a web service providing computer, the ICF blocks inbound traffic, so that the Internet connection is disconnected, and, therefore, normal web service cannot be offered. To solve this problem, the ICF permits inbound traffic to Port 80 used by service, thus being capable of allowing normal web service.

As described above, the ICF allows normal service to be used by adding services and protocols, and the PC firewall also provides such functions.

Meanwhile, the problem of the ICF is described below.

Recent Internet software, such as a web server, a File Transfer Protocol (FTP) server, a telnet server, a peer-to-peer (P2P) program, a remote control program and a messenger program, operates as service providing servers. Furthermore, the amount of software operating as a server as described above is increasing remarkably, and such software trends toward being used by many general users.

Figure 2:
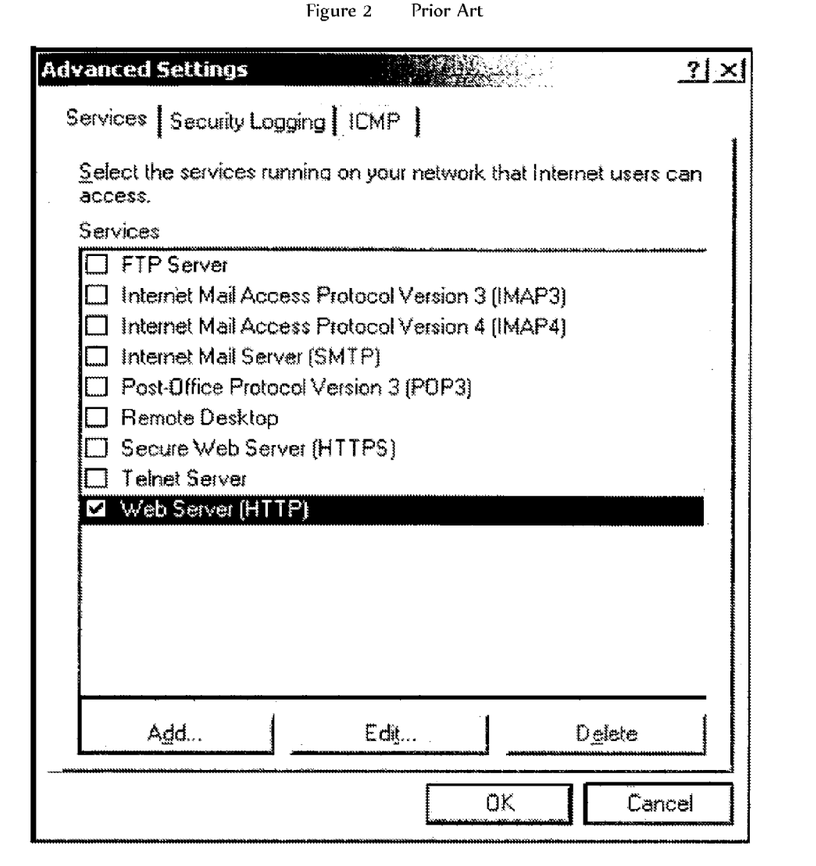
FIG. 2 is a view showing an interface screen that allows a port, a protocol, and an IP, which are used by software that operates as a server uses in Windows XP, to be added

However, most users avoid using stealth function of the ICF or PC firewall because the above-described software operating as a server does not operate normally. In Windows XP shown in FIG. 2, the corresponding software can be normally used by adding a port, a protocol, and an Internet Protocol (IP) used by the software operating as a server uses. However, it is difficult for inexpert users to set them because the inexpert users have difficulty in finding a port operating as a server.

Furthermore, since a port operating as a server may be changed when the version of the software is upgraded, normal service may be unexpectedly interrupted. For these reasons, there is a problem in that it is difficult for general users to use the stealth functions of the ICF and the PC firewall despite their desired characteristics.

DISCLOSURE OF INVENTION

Technical Problem

Accordingly, the present invention has been made keeping in mind the above problems occurring in the prior art, and an object of the present invention is to provide a network security system and method, in which a port, which is used by a program for which communication is permitted, is automatically added to or removed from an internet connection firewall, thus allowing inexpert users to easily use a desired function of the internet connection firewall.

Technical Solution

In order to accomplish the above object, the present invention provides a network security system for permitting a trusted process using a firewall, the firewall protecting a corresponding network connection of a computer to a network by setting restrictions on information communicated between networks, including a port monitoring unit for extracting information about a server port being used through a network communication program; an internal permitted program storage for extracting information about a program for which communication is permitted by the firewall, and registering the extracted information; an internal permitted port storage, if the port monitoring unit extracts the information about the server port being used using the program registered in the internal permitted program storage, registering the extracted information about the server port; and a device for making the firewall flexible, determining whether a destination port of a packet of inbound traffic has been registered in the internal permitted port storage, and if the destination port has not been registered, transmitting the corresponding packet to the firewall, and if the destination port has been registered, allowing the corresponding packet to bypass the firewall.

In addition, in order to accomplish the above object, the present invention provides a network security method of permitting a trusted process using a firewall, the firewall protecting a corresponding network connection of a computer to a network by setting restrictions on information communicated between networks, including the first step of extracting information about a server port being used through a network communication program; the second step of extracting information about a program for which communication is permitted by the firewall, and registering the extracted information in an internal permitted program storage; the third step of, if information about the server port being used is extracted using the program registered in the internal permitted program storage at the first step, registering the information about the extracted server port in an internal permitted port storage; the fourth step of determining whether a destination port of a packet of inbound traffic has been registered in the internal permitted port storage; the fifth step of, if, as a result of the determination at the fourth step, the destination port has not been registered, transmitting the packet of inbound traffic to the firewall and the sixth step of, if, as a result of the determination at the fourth step, the destination port has been registered, allowing the corresponding packet to bypass the firewall.

Preferably, in the case of performing communication using Transmission Control Protocol (TCP), the first step is extracts a listen port through hooking when a socket performs listen to operate as a server.

Preferably, in the case of communication using User Datagram Protocol (UDP), the first step extracts the server port by performing hooking in a user mode when a socketcalls a relevant function to receive a packet.

Advantageous Effects

As described above, in accordance with the present invention, a port which is used by a program for which communication is permitted is automatically added to or removed from the ICF, so that inexpert users are capable of easily using the ICF having excellent functionality.

BRIEF DESCRIPTION OF THE DRAWINGS

The above and other objects, features and advantages of the present invention will be more clearly understood from the following detailed description taken in conjunction with the accompanying drawings, in which.

BEST MODE FOR CARRYING OUT THE INVENTION

A flexible network security system and method for permitting a trusted process and method in accordance with an embodiment of the present invention is described in detail with reference to the accompanying drawings below.

First, the related art corresponding to the background of the present invention is described in brief.

Figure 3:
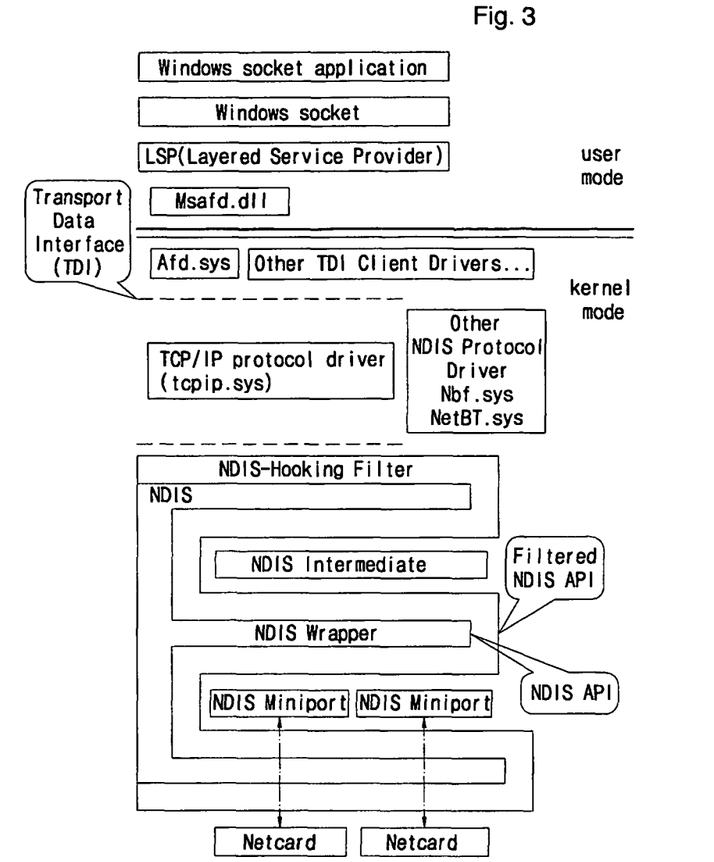
FIG. 3 is a block diagram showing the mode division of a Microsoft Windows operating system used in the present invention

FIG. 3 is a block diagram showing the mode division of a Microsoft Windows operating system used in the present invention.

Referring to FIG. 3, Windows XP, which is provided by Microsoft Inc., provides a kernel mode and a user mode. In the kernel mode, an operating system kernel and various kinds of device drivers are driven, and in the user mode, applications are mainly driven. Programs which operate in the kernel mode exist in the form of device drivers. A kernel mode network structure supported by the Microsoft Windows operating system includes afd.sys (AFD), that is, the kernel of a Windows socket, a Network Driver Interface Specification (NDIS), and a Transport Driver Interface (TDI).

The afd.sys which exists at the uppermost layer in the kernel mode communicates with msafd.dll, that is, a Dynamic link library (DLL) which exists at the lowermost layer in the user mode Windows socket, and constitutes an interface with TDI existing at the lower layer thereof.

The TDI defines a kernel mode interface which exists above a protocol stack. The NDIS provides a standard interface for Network Interface Card Device Drivers (NICDDs).

A method of constructing a firewall in the user mode of the Microsoft Windows operating system is described below in brief.

Hooking refers to a widely known programming method that stores the address of a original function intended to be hooked, and replaces the address of the original function with the address of a function made by the user, thus allowing the original function to be executed afterward through the execution of the function made by the user.

1) Winsock Layered Service Provider (LSP)

This method is a method provided by Microsoft Inc., which is based on a Service Provider Interface (SPI) that is a component existing in Microsoft networking widely used in Quality Of Service (QOS), URL filtering, and the encryption of a data stream.

2) Windows 2000 Packet Filtering Interface

Windows 2000 uses a method of installing a filter descriptor so that an application program in the user mode can perform permission and blocking on the basis of an IP address and port information.

3) Winsock Dll Replacement

This method is based on a method of filtering by replacing the Winsock DLL of Microsoft Windows with a DLL made by the user.

4) Global Function Hooking

This method is based on a method of hooking the socket functions in Windows, such as Connect, listen, Send, Recv, Sendto, and Recvfrom, or a DeviceIoControl( ) function that application in the user mode uses to communicate with a driver in the kernel mode.

A method of constructing a firewall in the kernel mode of the Microsoft Windows operating system is described in brief below.

1) Kernel Mode Socket Filter

This scheme is based on a method of hooking all the Inputs/Outputs (I/Os) in which msafd.dll, which is a DLL existing at the lowermost layer below a Windows socket in the user mode, communicates with afd.sys, which is a kernel mode Windows socket.

2) TDI Filter Driver

This scheme is based on a method of utilizing a filter driver produced by applying an IoAttackDevice( ) API to a device created by a tcpip.sys driver, such as \Device\RawIp, \Device\Udp, \Device\Tcp, \Device\Ip, \Device\MULTICAST. Alternatively, this method is based on a method of hooking all I/Os by replacing a dispatch table existing in the driver object of tcpip.sys.

3) NDIS InterMediate (IM) Driver

This scheme is a method, which is provided to users by Microsoft Inc., and allows a firewall and a Network Address Translation (NAT) to be developed through insertion between a protocol driver, such as TCP/IP, and an MC driver.

4) NDIS Hooking Filter Driver

This scheme is a method of hooking the functions of a NDIS library, which is based on a method of hooking functions, such as NdisRegisterProtocol, NdisDeregisterProtocol, NdisOpenAdapter, NdisCloseAdapter and NdisRegisterProtocol, or a method of hooking the I/Os of a Protocol driver and an MC driver in communication with the NDIS after finding an existing registered protocol driver link on the basis of a returned NdisProtocolHandle, such as TCP/IP, using an NdisRegisterProtocol function that registers the Protocol driver thereof.

The ICF according to the present invention may be implemented in the above-described kernel mode socket filter, TDI filter driver, NDIS IM driver and NDIS hooking filter, and is generally implemented in the NDIS IM driver or NDIS hooking filter driver.

The ICF maintains the entire communication table of EPs and ports by keeping track of traffic originating from an ICF computer. All inbound traffic from the Internet is compared with items existing in this communication table. Only when it is proved that a matching item exists in the table and, therefore, communication originated from the user's computer, inbound Internet traffic is permitted; otherwise the traffic is blocked.

Granting permission to the inbound traffic is performed by calling the address of a hooked original function. In contrast, blocking to the inbound traffic is performed by sending a false return indicating that the call to the original function succeeded or failed without calling the original function, or providing false information so that the original function is called but the performance of the function is not performed normally.

A flexible network security system and method for permitting a trusted process according to the present invention is described based on the above-described basic description related to the firewall.

Figure 4:
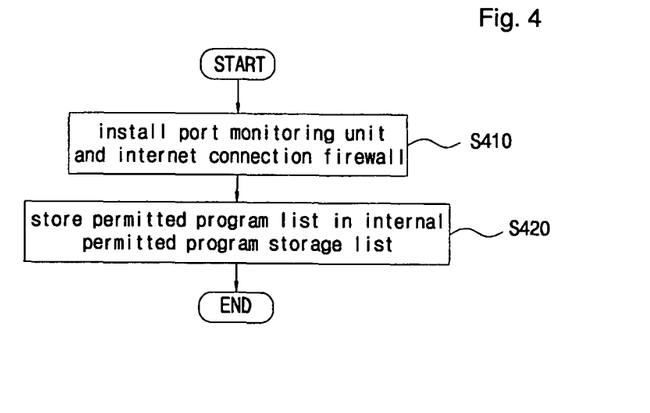
FIG. 4 is a schematic flow chart showing the operation of an ICF according to the present invention, which illustrates processes of installing a port monitoring unit and the ICF, and storing a permitted program list in an internal permitted program storage

FIG. 4 is a schematic flowchart showing the operation of an ICF according to the present invention, which illustrates processes of installing a port monitoring unit and the ICF, and storing a permitted program list in an internal permitted program storage.

First, at step S410, a port monitoring unit and an ICF are installed.

In the case of TCP, when a socket performs listen to operate as a server, the port monitoring unit extracts a listen port through Winsock hooking. Furthermore, when a corresponding operation is performed in msafd.dll, a corresponding operation in a kernel is performed in the AFP, that is, the socket part of the kernel, or TDI_EVENT_CONNECT is called through TdiSetEvent( ) in the TDI, the port monitoring unit extracts the listen port.

In the case of User Datagram Protocol (UDP), when a socket calls recvfrom to receive a packet, a server port for receiving the packet is extracted by Winsock hooking in the user mode. Furthermore, when a successive operation in the AFD exists in the kernel mode, or when TDI_EVENT_RECEIVE_DATAGRAM is created through corresponding TdiSetEvent( ), a server port for receiving a packet is extracted.

The port monitoring unit is installed by Winsock hooking in the user mode, or by the kernel mode socket filter and the TDI filter driver in the kernel mode, and functions to extract server port information, protocol information (TCP, UDP, etc.), and OPEN/CLOSE information.

Thereafter, the ICF is installed. Such an ICF may be implemented in a kernel mode socket filter, a TDI filter driver, an NDISIM driver, a Windows 2000 filter hook driver and an NDIS hooking filter driver, and is generally installed through the NDIS IM driver or the NDIS hooking filter driver in the same manner as described above.

Figure 5:
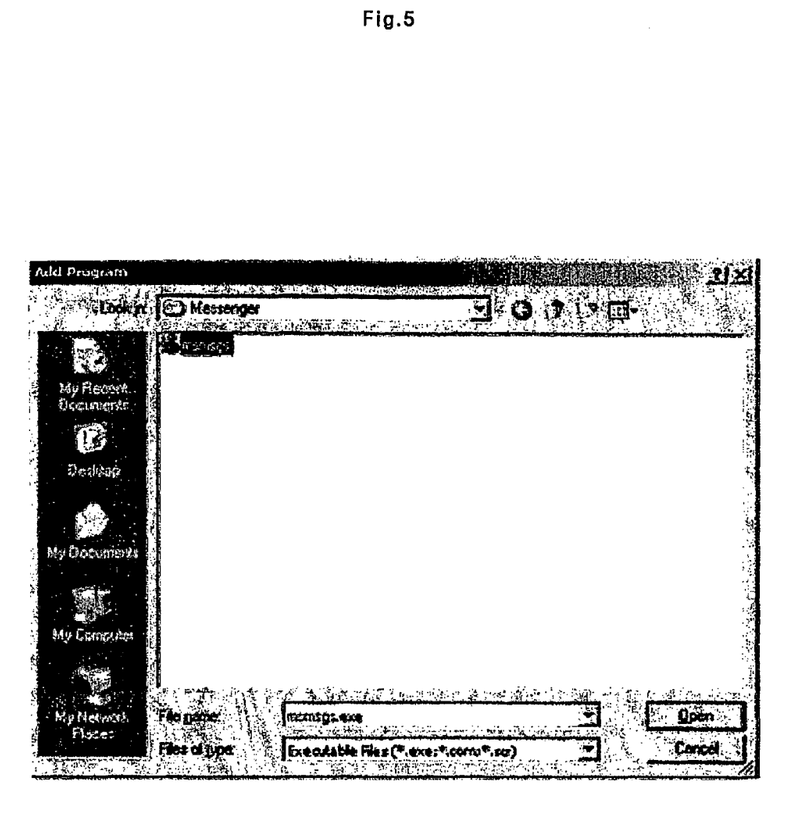
FIG. 5 is a view showing an interface screen that is displayed to allow a communication permitted program list to be stored in an internal permitted program storage in a flexible ICF in accordance with an embodiment of the present invention.

Then, at step S420, a permitted program list is stored in an internal permitted program storage. FIG. 5 is a view showing an interface screen that is displayed to allow a communication permitted program list to be stored in an internal permitted program storage in the flexible ICF in accordance with an embodiment of the present invention.

As shown in FIG. 5, when a program to be permitted by the ICF is selected, a program name, the entire path of a program, and, the Message Digest algorithm 5 (MD5) hash value of a corresponding program file for checking, and the integrity of the program are obtained. The program name, the entire path of a program, and the program MD5 hash value obtained as described above are stored in the internal permitted program storage.

The internal permitted program storage stores data in the form of the following Table 1, and in the form of a file or a database including information about the program name, the entire path of a program, and the program MD5 hash value.

TABLE 1

| | Entire path of program | Program MD5 hash value |
|---|---|---|
| 1 | D:\Program Files\MSN Messenger\msnmsgr.exe | 0x8327648276482736868237648264 37872 |
| 2 | D:\Program Files\ PcAnywhere.exe | 0x9384729387429837942797392847 9374 |
| 3 | ... | |

Figure 6:
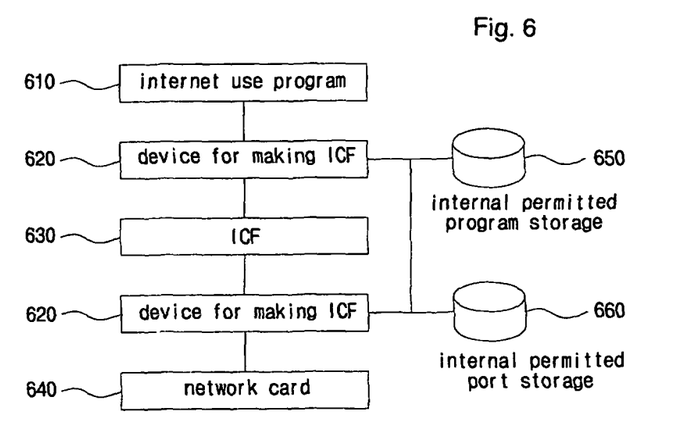
FIG. 6 is a block diagram showing the operation of an entire firewall using a device for making an ICF flexible according to the present invention

FIG. 6 is a block diagram showing the operation of an entire firewall using a device for making an ICF flexible device according to the present invention, which is described in detail below.

When an Internet use program 610 opens a server port to operate as a server, a device for making an ICF flexible 620 determines whether a program, which opened the corresponding server port, has been registered in an internal permitted program storage 650.

When the corresponding program has been registered, the device for making an ICF flexible 620 registers the opened server port in an internal permitted port storage 660.

Meanwhile, when inbound traffic is transmitted from the outside, the inbound traffic reaches an ICF 630 after passing through a network card 640. The device for making an ICF flexible 620 determines whether a destination port has been registered in the internal permitted port storage 660 by examining the packets of the inbound traffic.

If, as a result of the determination, the corresponding port has not been registered, a packet is transmitted to the ICF 630 and the packet is blocked. However, if the corresponding port has been registered, a packet is not permitted to pass through the ICF 630, and a hooked original function is called to bypass the packet to the device for making an ICF flexible 620 registers.

The following Table 2 is an example showing ports registered in the internal permitted port storage.

TABLE 2

| | Entire path of program | Protocol | Port |
|---|---|---|---|
| 1 | D:\Program Files\MSN Messenger\msnmsgr.exe | TCP | 1863 |
| 2 | D:\Program Files\MSN Messenger\msnmsgr.exe | TCP | 6891 |
| 3 | D:\Program Files\PcAnywhere\PcAnywhere.exe | TCP | 5631 |
| 4 | D:\Program Files\PcAnywhere\PcAnywhere.exe | UDP | 5632 |
| ... | | | |

As shown in Table 2, the internal permitted port storage includes information about the entire path of a program, the protocol and the port, and may exist in the forms of an array or connection list in memory, or in the form of a file or a database.

Figure 7:
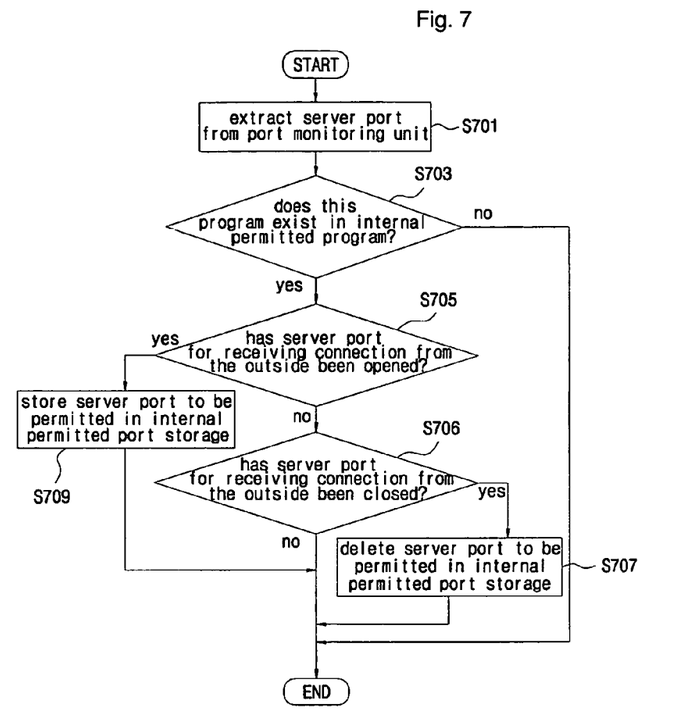
FIG. 7 is a flowchart showing a process of storing and deleting a server port in and from the internal permitted port storage of a flexible ICF according to an embodiment of the present invention and FIG. 8 is a flowchart showing a packet processing flow performed in front of an ICF in accordance with an embodiment of the present invention.

FIG. 7 is a flowchart showing a process of storing and deleting a server port in and from the internal permitted port storage of a flexible ICF according to an embodiment of the present invention, which is described in detail below.

First, at step S701, information about a server port, OPEN/CLOSE information, and information about protocol are extracted from the port monitoring unit, and then, at step S703, the port monitoring unit determines whether a current program, which opened the server port, has been registered in the internal permitted program storage.

Meanwhile, a method of obtaining information about a current process that is using a network is performed in such a way that the port monitoring unit extracts the ID information of the current process using a PsGetCurrentProcessId( ) function, and acquires the entire path of the current program through the process ID. The MD5 hash value of the corresponding program is extracted through the entire path of the program obtained as described above, and it is determined whether the current program exists in the internal permitted program storage using the MD5 hash value and the entire path of the program.

If, as a result of the determination at step S703, the current program has not been registered, the process ends. In contrast, if the current program has been registered, at step 705, it is determined whether the server port is opened or closed using the extracted OPEN/CLOSE information.

If, as a result of the determination at step S705, the server port has been opened, the information about the entire path of the program, the protocol and the server port is registered at step S709, and the process ends.

In contrast, if, as a result of the determination at step S705, the server port has not been opened, the items of the permitted port storage matched with the information about the entire path of the program, the protocol and the server port are searched for and then deleted at steps S706 and S707, and the process ends.

Figure 8:
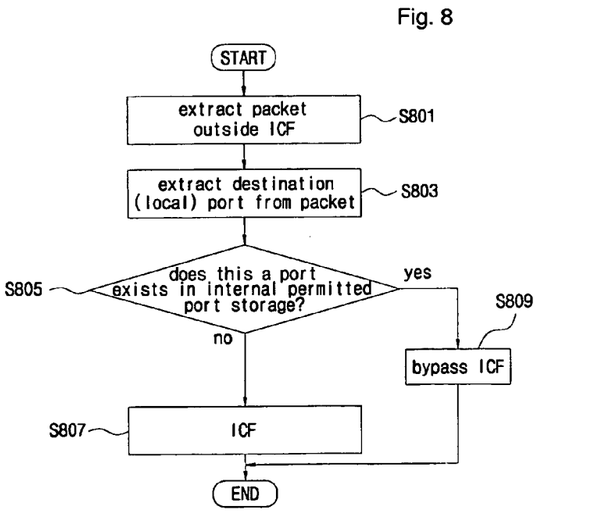

FIG. 8 is a flowchart showing a packet processing flow performed in front of an ICF in accordance with an embodiment of the present invention, which is described in detail below.

First, at step S801, a packet is extracted from inbound traffic before being processed by the ICF and, then, at step S805, information about a corresponding destination (local) port and a protocol is extracted from the extracted packet.

Thereafter, at step S805, it is determined whether information about a corresponding destination (local) port and a protocol has been registered in the internal permitted port storage.

If, as a result of the determination at step S805, the information has not been registered, the corresponding packet is transmitted to the ICF at step S807. In contrast, if the information has been registered, the destination port must be a permitted port, so that the inbound traffic is allowed to bypass the ICF by calling a hooked original function.

MODE FOR THE INVENTION

Although the preferred embodiments of the present invention have been disclosed for illustrative purposes, it will be apparent to those skilled in the art that various modifications, additions and substitutions thereof are possible, without departing from the spirit of the invention. Accordingly, the scope of the invention will be limited only by the accompanying claims, in which it will be appreciated that the examples of the modifications, additions and substitutions are all included.

INDUSTRIAL APPLICABILITY

As described above, in accordance with the present invention, a port which is used by a program for which communication is permitted is automatically added to or removed from the ICF, so that inexpert users are capable of easily using the ICF having excellent functionality.

The invention claimed is:

1. A network security system controlling inbound traffic by using a firewall, the firewall protecting a corresponding network connection of a computer to a network by setting restrictions on information communicated between networks, comprising:
    a port monitoring unit extracting information about a server port, wherein the server port is designated as a port of a network communication program;
    an internal permitted program storage storing a list of programs permitted by the firewall, wherein the internal permitted program storage adds a program to the list by extracting information about the program for which communication is to be permitted by the firewall; and
    a firewall flexible device determining whether the network communication program is registered in the list of programs stored in the internal permitted program storage;
    wherein the firewall flexible device automatically stores the extracted information about the server port in an internal permitted port storage if the network communication program is registered in the list of programs stored in the internal permitted program storage; and
    wherein the firewall flexible device further determines whether a port of a packet of inbound traffic matches with the server port and blocks the packet of inbound traffic if the port does not match with the server port.

2. The network security system as set forth in claim 1, wherein the information about the program includes information about at least one of a program name, an entire path of the program, and a program hash value.

3. The network security system as set forth in claim 1, wherein the information about the server port includes information about at least one of an entire path of the program, a protocol, and a port.

4. The network security system as set forth in claim 1, wherein the firewall flexible device allows the packet of inbound traffic to bypass the firewall if the port matches with the server port.

5. The network security system as set forth in claim 1, wherein the firewall flexible device stores the extracted information about the server port if the server port is determined to be opened.

6. The network security system as set forth in claim 1, wherein the extracted information about the server port is deleted from the internal permitted port storage if the server port is determined to be closed.

7. A network security method controlling inbound traffic by using a firewall, the firewall protecting a corresponding network connection of a computer to a network by setting restrictions on information communicated between networks, comprising: storing in an internal permitted program storage a list of programs permitted by the firewall; adding a network communication program to the list of programs by extracting information about the network communication program for which communication is to be permitted by the firewall; extracting information about a server port, wherein the server port is designated as a port of the network communication program; automatically storing, by the firewall, the extracted information about the server port in an internal permitted port storage if the network communication program is registered in the list of programs stored in the internal permitted program storage; determining whether the network communication program is registered in the list of programs stored in the internal permitted program storage; determining whether a port of a packet of inbound traffic matches with the server port; and blocking the packet of inbound traffic if the port does not match with the server port.

8. The network security method as set forth in claim 7, wherein the information about the program includes information about at least one of a program name, an entire path of the program, and a program hash value.

9. The network security method as set forth in claim 7, wherein the information about the server port includes information about at least one of an entire path of the program, a protocol, and a port.

10. The network security method as set forth in claim 7, further comprising:
   allowing the packet of inbound traffic to bypass the firewall if the port matches with the server port.

11. The network security method as set forth in claim 7, further including:
   storing the extracted information about the sever port in the internal permitted port storage if the server port is determined to be opened.

12. The network security method as set forth in claim 7, further including:
   deleting the extracted information about the sever port from the internal permitted port storage if the server port is determined to be closed.

13. A computer recordable device storing a program for performing a network security method which, when executed by one or more processors, causes the one or more processors to control inbound traffic the method comprising: storing in an internal permitted program storage a list of programs permitted by a firewall; adding a network communication program to the list of programs by extracting information about the network communication program for which communication is to be permitted by the firewall; extracting information about a server port, wherein the server port is designated as a port of the network communication program; automatically storing, by the firewall, the extracted information about the server port in an internal permitted port storage if the network communication program is registered in the list of programs stored in the internal permitted program storage; determining whether the network communication program is registered in the list of programs stored in the internal permitted program storage; determining whether a port of a packet of inbound traffic matches with the server port; and blocking the packet of inbound traffic if the port does not match with the server port.

14. The computer recordable device as set forth in claim 13, wherein the method further including:
   storing the extracted information about the sever port in the internal permitted port storage if the server port is determined to be opened.

15. The computer recordable device as set forth in claim 13, wherein the method further including:
   deleting the extracted information about the sever port from the internal permitted port storage if the server port is determined to be closed.

16. A network security system controlling inbound traffic by using a firewall, the firewall protecting a corresponding network connection of a computer to a network by setting restrictions on information communicated between networks, comprising:
   a port monitoring unit extracting information about a server port, wherein the server port is designated as a port of a network communication program;
   an internal permitted program storage storing a list of programs permitted by the firewall, wherein the internal permitted program storage adds a program to the list by extracting information about the program for which communication is to be permitted by the firewall; and
   a firewall flexible device determining whether the server port is opened or closed and whether the network communication program is registered in the list of programs stored in the internal permitted program storage;
   wherein the firewall flexible device automatically stores the extracted information about the server port in an internal permitted port storage if the server port is opened and the network communication program is registered in the list of programs stored in the internal permitted program storage;
   wherein the firewall flexible device determines whether a port of a packet of inbound traffic matches with the server port and blocks the packet of inbound traffic if the port does not match with the server port.

17. The network security system as set forth in claim 16, wherein the firewall flexible device deletes the extracted information about the server port from the internal permitted port storage if the server port is determined to be closed.

18. The network security system as set forth in claim 16, wherein the information about the program includes information about at least one of a program name, an entire path of the program, and a program hash value.

19. The network security system as set forth in claim 16, wherein the information about the server port includes information about at least one of an entire path of the program, a protocol, and a port.

20. The firewall as set forth in claim 16,
wherein the firewall flexible device allows the packet of inbound traffic to bypass the firewall if the port matches with the server port.

21. A network security method controlling inbound traffic by using a firewall, the firewall protecting a corresponding network connection of a computer to a network by setting restrictions on information communicated between networks, comprising: storing in an internal permitted program storage a list of programs permitted by the firewall; adding a network communication program to the list of programs by extracting information about the network communication program for which communication is to be permitted by the firewall; extracting information about a server port, wherein the server port is designated as a port of the network communication program; determining whether the network communication program is registered in the list of programs stored in the internal permitted program storage and whether the server port is opened or closed; automatically storing, by the firewall, the extracted information about the server port in an internal permitted port storage if the network communication program is registered in the list of programs stored in the internal permitted program storage and the server port is opened; determining whether a port of a packet of inbound traffic matches with the server port; and blocking the packet of inbound traffic if the port does not match with the server port.

22. The network security method as set forth in claim 21, wherein the method further comprises deleting the information about the server port if the server port is determined to be closed.

23. The network security method as set forth in claim 21, wherein the information about the program includes information about at least one of a program name, an entire path of the program, and a program hash value.

24. The network security method as set forth in claim 21, wherein the information of the server port includes information about at least one of an entire path of the program, a protocol, and a port.

25. The method as set forth in claim 21, further comprising:
allowing the packet of inbound traffic to bypass the firewall if the port matches with the server port.

\* \* \* \* \*